(12) United States Patent
Li et al.

(10) Patent No.: US 11,974,355 B2
(45) Date of Patent: Apr. 30, 2024

(54) INDICATION INFORMATION SENDING METHOD, APPARATUS AND SYSTEM, AND STORAGE MEDIUM

(71) Applicant: ZTE Corporation, Shenzhen (CN)

(72) Inventors: Zhendong Li, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 9 days.

(21) Appl. No.: 17/172,711

(22) Filed: Feb. 10, 2021

(65) Prior Publication Data

US 2021/0168585 A1 Jun. 3, 2021

Related U.S. Application Data

(63) Continuation of application No. PCT/CN2019/100111, filed on Aug. 10, 2019.

(30) Foreign Application Priority Data

Aug. 10, 2018 (CN) .......................... 201810912161.6

(51) Int. Cl.
*H04W 8/12* (2009.01)
*H04W 8/24* (2009.01)
(Continued)

(52) U.S. Cl.
CPC ............... *H04W 8/12* (2013.01); *H04W 8/24* (2013.01); *H04W 36/32* (2013.01); *H04W 48/16* (2013.01); *H04W 92/02* (2013.01)

(58) Field of Classification Search
CPC ......... H04W 8/12; H04W 8/24; H04W 36/32; H04W 48/16; H04W 92/02;
(Continued)

(56) References Cited

U.S. PATENT DOCUMENTS

| 2019/0098537 A1* | 3/2019 | Qiao | ...................... H04W 36/10 |
| 2019/0174449 A1* | 6/2019 | Shan | ...................... H04W 60/00 |

(Continued)

FOREIGN PATENT DOCUMENTS

| CN | 107018542 A | 8/2017 |
| CN | 107592328 A | 1/2018 |

(Continued)

OTHER PUBLICATIONS

Extended European Search Report for EP 19847453.8 dated Nov. 11, 2021, 14p.

(Continued)

*Primary Examiner* — Charles N Appiah
*Assistant Examiner* — Frank E Donado
(74) *Attorney, Agent, or Firm* — Crowell & Moring LLP

(57) ABSTRACT

Provided are an indication information sending method, apparatus and system, a storage medium, and an electronic device, where the indication information sending method includes: sending, by a first access and mobility management function (AMF), first indication information to a first target network element, where the first indication information is used for indicating whether a packet data unit (PDU) session is capable of interworking with a target network system.

11 Claims, 7 Drawing Sheets

(51) Int. Cl.
*H04W 36/32* (2009.01)
*H04W 48/16* (2009.01)
*H04W 92/02* (2009.01)

(58) Field of Classification Search
CPC . H04W 36/0011; H04W 76/22; H04W 92/24; H04W 48/08; H04W 36/0033; H04W 36/0022; H04W 36/14; H04W 36/385
See application file for complete search history.

(56) References Cited

U.S. PATENT DOCUMENTS

| | | | | |
|---|---|---|---|---|
| 2020/0112898 | A1* | 4/2020 | Ramle | H04W 8/08 |
| 2020/0120570 | A1* | 4/2020 | Youn | H04W 76/11 |
| 2020/0275331 | A1* | 8/2020 | Kim | H04W 36/0033 |
| 2020/0322857 | A1* | 10/2020 | Park | H04W 76/34 |
| 2020/0383011 | A1* | 12/2020 | Wang | H04W 28/24 |
| 2020/0396587 | A1* | 12/2020 | Kim | H04W 8/04 |
| 2021/0084713 | A1* | 3/2021 | Miklós | H04W 36/12 |
| 2021/0153006 | A1* | 5/2021 | Kim | H04W 8/245 |
| 2021/0153111 | A1* | 5/2021 | Theimer | H04L 12/4641 |
| 2023/0138587 | A1* | 5/2023 | Dao | H04L 12/14 370/329 |

FOREIGN PATENT DOCUMENTS

| | | | |
|---|---|---|---|
| CN | 110915260 B * | 12/2021 | ........ H04W 36/0033 |
| KR | 102371810 B1 * | 3/2022 | |
| WO | WO 2018/006650 A1 | 1/2018 | |
| WO | WO 2018/034924 A1 | 2/2018 | |
| WO | WO 2018/177277 A1 | 10/2018 | |

OTHER PUBLICATIONS

First Office Action and Search Report for Chinese application No. 201810912161.6 dated Dec. 23, 2021, 9p, in Chinese language.
English translation of D5, 5p.
International Search Report for international priority application No. PCT/CN2019/100111, dated Oct. 28, 2019, 4 pages, in English and Chinese languages.
LG Electronics, "Session handling for interworking without N26", 3GPP TSG-SA WG2 Meeting #127 S2-183764, Apr. 20, 2018, Section 5.17.2.3.1.
Huawei et al., "Multiple PDU session per DNN for case without N26", 3GPP TSG-SA WG2 Meeting #127bis S2-185110, Jun. 1, 2018, section 5.17.2.3.1.
LG Electronics, "Session handling for interworking without N26", 3GPP TSG-SA WG2 Meeting #127 S2-183766, Apr. 20, 2018, section 4.3.2.2.1 and section 4.11.2.2.
Huawei et al., "Multiple PDU sessions per DNN", 3GPP WG2 Meeting #127 S2-183439, Apr. 20, 2018, xp.
Supplementary Partial European Search Report for EP 19847453.8 dated Jun. 8, 2021, 17p.
LG Electronics, Inc., "TS 23.502: UE triggered PDU Session Activation procedure in connected mode," S2-170851 (revision of S2-170232), SA WG2 Meeting #119, Feb. 13-17, 2017, Dubrovnik, Croatia, 6p.
Huawei, HiSilicon, "Multiple PDU session per DNN for case without N26," S2-185877 (revision of S2-185110), 3GPP TSG-SA WG2 Meeting #127bis, Change Request, May 28-Jun. 1, 2018, Newport Beach, US, 4p.
Written Opinion for corresponding application No. SG 11202101411P dated Nov. 25, 2022, 10p.
Communication pursuant to Article 94(3) EPC for corresponding European application No. 19 847 453.8 dated Mar. 6, 2023, 6p.
Japanese Office Action for corresponding application No. JP 2021-507086 dated Jul. 18, 2023, 3p, in Japanese language.
English language translation for Japanese Office Action for corresponding application No. JP 2021-507086 dated Jul. 18, 2023, 6p.
Huawei et al., "Clarification on SMF registration to UDM+HSS", 3GPP TSG-SA WG2 Meeting #129bis, S2-1812964, Change Request version 15.3.0, Nov. 30, 2018, US, 19p.
Author unknown, "Procedures for the 5G System", *Third Generation Partnership Project, Technical Specification Group Services and Systems Aspects*, Stage 2, Release 15, v15.2.0, Jun. 2018, 18p.

* cited by examiner

INDICATION INFORMATION SENDING METHOD, APPARATUS AND SYSTEM, AND STORAGE MEDIUM

RELATED APPLICATIONS

This application is a continuation of International Application No. PCT/CN2019/100111, filed Aug. 10, 2019, which claims priority to China Patent Application No. 201810912161.6, filed Aug. 10, 2018. The entireties of the above applications are hereby incorporated by reference.

TECHNICAL FIELD

The present application relates to the field of communications and, in particular, to an indication information sending method, apparatus and system, and a storage medium.

BACKGROUND

There is a one-to-one mapping relationship between the access point names (APNs) in the fourth generation communication (4G) system and data network names (DNNs) in the fifth generation communication (5G) system.

When a packet data network connection (PDN connection) is established in the 4G system, there is a restriction condition that a mobility management entity (MME) must select the same PDN gateway (PGW) for multiple PDN connections established using the same APN.

However, in the 5G system, there is no such restriction condition. That is, for multiple packet data unit (PDU) sessions established using the same DNN, different session management function (SMF) entities may be selected by the mobility management (AMF) entity. Since the SMF and the PDN gateway control plane (PGW-C) are combined in one network element, the selection of different SMF+PGW-C in the 5G system means that after the session is transferred to the 4G system, multiple different PDN connections under the same APN have different PGWs, which violates the principle of the 4G system and thus cannot implement interworking from the 5G system to the 4G system.

In view of the problem that interworking across network systems for a user equipment (UE) can not be performed in the related art, no reasonable solution has yet been proposed.

SUMMARY

The embodiments of the present disclosure provide an indication information sending method, apparatus and system, a storage medium, and an electronic device to at least solve the problem that interworking across network systems for a user equipment (UE) can not be performed in the related art.

According to an aspect of the embodiments of the present disclosure, an indication information sending method is provided. The indication information sending method includes: sending, by a first AMF, first indication information to a first target network element, where the first indication information is used for indicating whether a PDU session is capable of interworking with a target network system.

Optionally, the step in which the first AMF sends the first indication information to the first target network element includes: in response to the first AMF receiving a request message in which a UE requests to set up a PDU session, sending, by the first AMF, a PDU session setup request to an SMF, where the PDU session setup request carries the first indication information, and the first indication information is used for indicating whether the PDU session is capable of interworking with the target network system.

Optionally, the step in which the first AMF sends the first indication information to the first target network element includes: in response to the first AMF determining that status parameter of the PDU session changes, sending, by the first AMF, a PDU session modification request to an SMF, where the PDU session modification request carries the first indication information, and the first indication information is used for indicating whether the PDU session is capable of interworking with the target network system.

Optionally, the step in which the first AMF sends the first indication information to the first target network element includes: in response to a inter-AMF mobility event in which a UE is transferred from the first AMF to a second AMF occurring, sending, by the first AMF, the first indication information to the second AMF, where the first indication information is used for indicating whether the PDU session of the UE under the first AMF is capable of interworking with the target network system.

Optionally, the step in which the first AMF sends the indication information to the second AMF includes: sending, by the first AMF, a UE context message to the second AMF, where the UE context message carries the first indication information.

Optionally, the step in which the first AMF sends the first indication information to the first target network element includes: sending, by the first AMF, the first indication information to an SMF, where the first indication information is used for indicating whether the PDU session under the SMF is capable of interworking with the target network system; and in response to an inter-AMF mobility event in which the UE is transferred from the first AMF to a second AMF occurring, sending, by the SMF, a message to the second AMF, where the message is used for indicating whether the PDU session under the SMF is capable of interworking with the target network system.

According to another aspect of the embodiments of the present disclosure, an indication information sending method is further provided. The indication information sending method includes: sending, by a first AMF, second indication information to a second target network element, where the second indication information is used for indicating that the second target network element stores DNN interworking information.

Optionally, the step in which the first AMF sends the second indication information to the second target network element includes: sending, by the first AMF, the second indication information to a unified data management (UDM) or a home subscription server (HSS), where the second indication information is used for indicating that the UDM or the HSS stores the DNN interworking information, and the DNN interworking information includes DNN information and at least one of: an SMF address or a PGW address.

Optionally, for each DNN, the UDM or the HSS stores one piece of DNN interworking information corresponding to the DNN.

Optionally, the step in which the first AMF sends the second indication information to the second target network element includes: in response to a inter-AMF mobility event in which the UE is transferred from the first AMF to a second AMF occurring, sending, by the first AMF, the second indication information to the second AMF, where the second indication information is used for indicating to store the DNN interworking information, and the DNN interworking information includes DNN information and at least one of: an SMF address or a PGW address.

Optionally, the inter-AMF mobility event includes at least one of: a connected state handover process or an idle state mobility process.

Optionally, the target network system is a 4G network system.

According to another aspect of the embodiments of the present disclosure, an indication information sending apparatus is further provided. The indication information sending apparatus is applied to a first AMF and includes a first sending module, which is configured to send first indication information to a target network element, where the first indication information is used for indicating whether a PDU session is capable of interworking with a target network system.

Optionally, the first sending module includes a first sending unit which is configured to, in response to the first AMF receiving a message in which a UE requests to set up the PDU session, send a PDU session setup request to an SMF, where the PDU session setup request carries the first indication information, and the first indication information is used for indicating whether the PDU session is capable of interworking with the target network system.

Optionally, the first sending module further includes a second sending unit which is configured to, in response to the first AMF determining that a status parameter of the PDU session changes, send a PDU session modification request to an SMF, where the PDU session modification request carries the first indication information, and the first indication information is used for indicating whether the PDU session is capable of interworking with the target network system.

Optionally, the first sending module further includes a third sending unit which is configured to, in response to an inter-AMF mobility event in which a UE is transferred from the first AMF to a second AMF occurring, send the first indication information to the second AMF, where the first indication information is used for indicating whether the PDU session of the UE under the first AMF is capable of interworking with the target network system.

According to another aspect of the embodiments of the present disclosure, an indication information sending apparatus is further provided. The indication information sending apparatus is applied to a first AMF and includes a second sending module, which is configured to send second indication information to a second target network element, where the second indication information is used for indicating that the second target network element stores DNN interworking information.

Optionally, the second sending module includes a fourth sending unit which is configured to send the second indication information to a UDM or an HSS, where the second indication information is used for indicating that the UDM or the HSS stores the DNN interworking information, and the DNN interworking information includes DNN information and at least one of: an SMF address or a PGW address.

Optionally, for each DNN, the UDM or the HSS correspondingly stores one piece of DNN interworking information.

Optionally, the second sending module further includes a fifth sending unit which is configured to, in response to an inter-AMF mobility event in which a UE is transferred from the first AMF to a second AFM occurring, send the second indication information to the second AMF, where the second indication information is used for indicating to store the DNN interworking information, and the DNN interworking information includes DNN information and at least one of: an SMF address or a PGW address.

According to another aspect of the embodiments of the present disclosure, an indication information sending system is further provided. The indication information sending system includes: a first AMF, which is configured to send first indication information to a target network element; and the target network element, which is configured to determine whether a PDU session is capable of interworking with a target network system according to the first indication information.

Optionally, the target network element includes an SMF, and in response to the first AMF receiving a message in which a UE requests to set up the PDU session, the first AMF is further configured to send a PDU session setup request to the SMF, where the PDU session setup request carries the first indication information, and the SMF is configured to determine whether the PDU session is capable of interworking with the target network system according to the first indication information carried in the PDU session setup request.

Optionally, in response to the first AMF determining that a status parameter of the PDU session changes, the first AMF is further configured to send a PDU session modification request to the SMF, where the PDU session modification request carries the first indication information, and the SMF is configured to determine whether the PDU session whose status parameter has changed is capable of interworking with the target network system according to the first indication information carried in the PDU session modification request.

Optionally, the system includes a second AMF, and in response to a inter-AMF mobility event in which the UE is transferred from the first AMF to the second AMF occurring, the first AMF is further configured to send the first indication information to the second AMF, and the second AMF is configured to determine whether the PDU session under the first AMF is capable of interworking with the target network system according to the first indication information.

According to another aspect of the embodiments of the present disclosure, an indication information sending system is further provided. The indication information sending system includes: a first AMF, which is configured to send second indication information to a second target network element, where the second indication information carries DNN interworking information; and the second target network element is configured to store the DNN interworking information according to the second indication information.

Optionally, the second target network element includes a UDM or an HSS, and the UDM or the HSS is configured to store the DNN interworking information according to the second indication information, where the DNN interworking information includes DNN information and at least one of: an SMF address or a PGW address.

Optionally, the second target network element includes a second AMF, and in response to a inter-AMF mobility event in which a UE is transferred from the first AMF to the second AMF occurring, the first AMF is further configured to send the second indication information to the second AMF, where the second indication information carries the DNN interworking information, and the second AMF is configured to store the DNN interworking information according to the second indication information, where the DNN interworking information includes DNN information and at least one of: an SMF address or a PGW address.

According to another aspect of the embodiments of the present disclosure, a storage medium is further provided.

The storage medium stores a computer program which is configured to, when executed, perform steps in any one of the preceding method embodiments.

According to another aspect of the embodiments of the present disclosure, an electronic device is further provided. The electronic device includes a memory and a processor. The memory stores a computer program, and the processor is configured to execute the computer program to perform steps in any one of the preceding method embodiments.

Through the solution provided in the embodiments of the present disclosure, a first AMF sends first indication information to a first target network element, where the first indication information is used for indicating whether a PDU session is capable of interworking with a target network system so that the first target network element can know which PDU session is capable of interworking with the target network system and thus can select the corresponding PDU session, thereby solving the problem that the interworking across network systems for the UE can not be performed in the related art and implementing the inter-network system interworking for the UE between different network systems.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Hereinafter, the present application will be described in detail with reference to drawings and in conjunction with embodiments. It is to be noted that if not in collision, the embodiments and features therein in the present application may be combined with each other.

It is to be noted that the terms such as "first" and "second" in the description, claims and drawings of the present application are used to distinguish between similar objects and are not necessarily used to describe a particular order or sequence.

Figure 1:
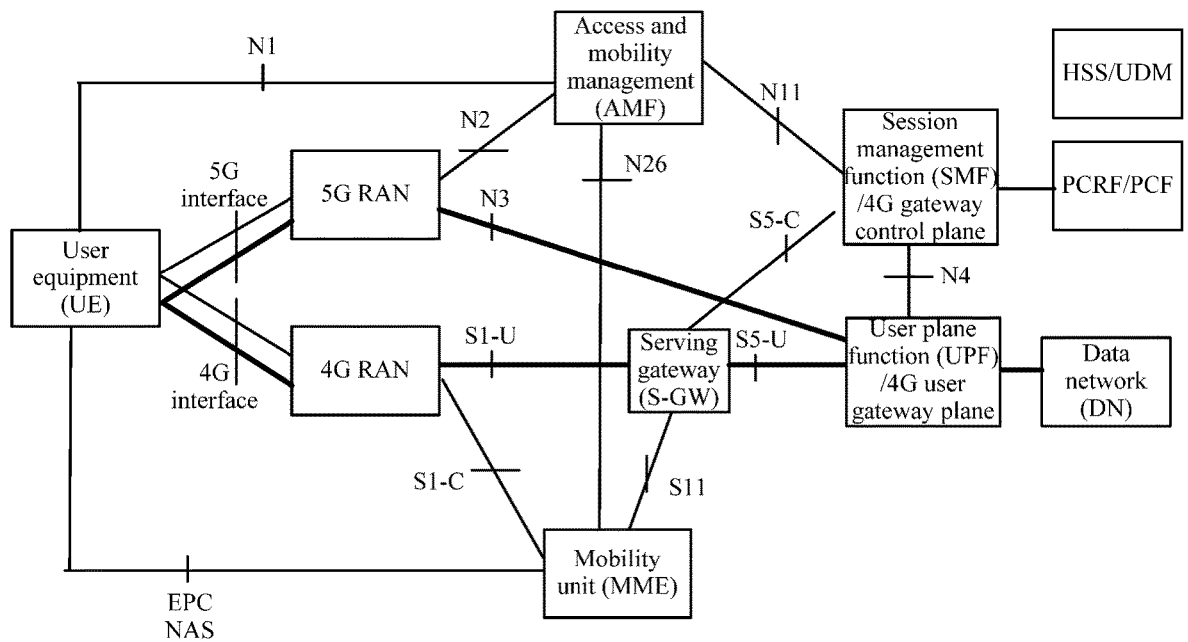
FIG. 1 illustrates a network architecture which satisfies bidirectional interworking between 4G and 5G in the related art.

FIG. 1 illustrates a network architecture which satisfies the bidirectional interworking between 4G and 5G in the related art. One core feature is that the architecture is compatible with both 4G and 5G architectures. Another core feature is that a PGW-C and an SMF are co-located, a PDN gateway user plane (PGW-U) and a user plane function (UPF) are co-located, a policy control function (PCF) and a policy and charging control function (PCRF) are co-located, and the user plane of the UE is always anchored on the UPF or the PGW-U. An N26 interface may or may not be deployed between the AMF and the MME. The system has different flows to handle the case of having the N26 interface deployed and the case of having no N26 interface deployed.

The network elements in the architecture are illustrated below.

User equipment (UE): the UE accesses a 4G or 5G network mainly through a wireless air interface and obtains services, and the UE performs information interaction with a base station through an air interface and performs information interaction through non-access stratum (NAS) signaling and a management entity (when the UE accesses the 4G network, the UE interacts with the MME whereas when the UE accesses the 5G network, the UE interacts with the AMF and the SMF) of a core network.

4G base station (a radio access network (RAN), an E-Node B (eNB)): the 4G base station is responsible for air interface resource scheduling and air interface connection management of a network which the UE accesses.

5G base station (a next generation-radio access network (NG RAN), a radio access network): the 5G base station is responsible for air interface resource scheduling and air interface connection management of a network which the UE accesses, and the NG RAN base station may adopt new radio (NR) access technology (gNB) or enhanced Long Term Evolution (eLTE) technology.

Mobility management entity (MME): the MME is a 4G core network control plane entity and is mainly responsible for user authentication, authorization and subscription checking, user mobility management, PDN connection and bearer maintenance, and paging triggering in a user IDLE state.

Serving gateway (GW): the serving GW is a 4G core network user plane function entity and is mainly responsible for the interaction with a PDN GW in the case of roaming.

Packet data network gateway (PDN GW): the PDN GW is a 4G core network user plane function entity and an access point through which the UE accesses the PDN network, is responsible for user Internet protocol (IP) address allocation, network-triggered bearer setup, modification and deletion, and QoS control and charging, and is the anchor point of the user in the 3rd Generation Partnership Project (3GPP) system so that the IP address is ensured to be unchanged and service continuity is ensured. In a control and forwarding separation architecture, the P-GW is further divided into two parts: a control entity PGW-C and a user plane entity PGW-U, where the PGW-C is responsible for signaling control and the PGW-U is responsible for IP forwarding.

Home subscription server (HSS): the HSS stores subscription information of the user. Policy and charging control function (PCRF): the PCRF is responsible for the formulation of policy and charging rules, provides network control rules based on service data flows, where the network control includes service data flow detection, gating control, Quality of Service (QoS) control, a charging rule based on data flows, and the like, and sends the policy and charging rules formulated by the PCRF itself to the P-GW for execution.

Control functions of the 5G network are illustrated below.

Session management function (SMF): the SMF interacts with the UE and is mainly responsible for processing requests of user PDU session setup, modification and deletion, selecting a user plane function (UPF), setting up a user plane connection between the UE and the UPF, and determining, with the PCF, the QoS parameter of the session.

Access and mobility control function (AMF): the AMF is a common control plane function in the core network, and a user has only one AMF that is responsible for user authentication, authorization, and subscription checking to ensure that the user is a legitimate user; user mobility management which includes location registration and temporary identity allocation; selecting an appropriate SMF when the user initiates a PDU connection setup request; forwarding the NAS signaling between the UE and the SMF, and forwarding access stratum (AS) signaling between the base station and the SMF.

User plane function (UPF): the UPF provides the user plane processing function including data forwarding and QoS execution and also provides user plane anchor points when the user moves to ensure the service continuity.

Policy Control Function (PCF): the PCF provides the resource authorization function and is very similar to the PCRF in the 4G era.

Unified data management function (UDM): the UDM stores subscription data of the user and is similar to the HSS in the 4G era.

In order to ensure the continuity of the handover of the UE between the 4G-5G systems, when the UE sets up a PDU session in the 5G system and the UE moves to the 4G system, a corresponding PDN connection is generated. When the UE sets up a PDU session in the 4G system, when the UE moves to the 5G system, there is also a corresponding PDN connection generated.

When the UE requests to set up a PDU session in the 5G system, the UE carries a DNN parameter to indicate the data network to which the PDU session is connected, and meanwhile, the UE allocates a unique PDU session identifier (ID) in this UE and sends this unique PDU session ID to the network. When the UE sets up a PDN connection in the 4G system, the UE carries an APN parameter to indicate the data network to which the PDN connection is connected. In order to ensure the interworking for the UE between 4G and 5G, there is a mapping relationship between the APN and the PDN.

In order to implement seamless mobility (that is, the IP address is unchanged), there are two different scenarios.

In the scenario where there is an N26 interface, when the UE sets up or modifies the PDU session in the 5G system, the network generates a session parameter corresponding to the 4G PDN connection and sends the session parameter to the UE. When the UE sets up or modifies the PDU connection in the 4G system, the UE generates a corresponding PDU session ID and sends the PDU session ID to the SMF+PGW-C, and the SMF+PGW-C also generates a session parameter corresponding to the 5G PDU session and sends the session parameter to the UE.

When a mobility process (handover, or idle state mobility) between the 4G and 5G systems occurs for a UE, a target system generates a corresponding PDN connection/PDU Session at the target system according to session information created by a source system.

In the scenario where there is no N26 interface, when the UE sets up the PDU session in the 5G system, the SMF+PGW-C stores DNN and PGW-C identification information (such as PGW-C Fully Qualified Domain Name (FQDN)) corresponding to this PDU session in the context of this session of the UE in the UDM or the HSS. When the UE moves to the 4G system, the UE requests to re-establish the PDN connection, indicates that this session is an existing session, and carries PDU session ID information. The MME obtains the APN (mapped from the DNN) and PGW-C identification information from the UDM or the HSS, matches the APN and PGW-C identification information with the APN received from the UE, and sends the session setup request to the PGW corresponding to the PGW-C identification information (through the S-GW). The SMF+PGW-C, after receiving the session setup request, finds the corresponding session according to the PDU session ID in this request and completes the re-establishment at the 4G side.

When the UE sets up the PDU connection in the 4G system, the SMF+PGW-C stores APN and PGW-C identification information (such as PGW-C FQDN) corresponding to this PDU connection in the UDM or the HSS. When the UE moves to the 5G system, The UE requests to reestablish the PDU session, the principle of which is similar to that of the restoration process at the 4G side.

Since the SMF and the PGW-C are co-located in a network element, the selection of different SMF+PGW-C in the 5G system means that after the session is transferred to the 4G system, multiple different PDN connections under the same APN have different PGWs, which violates the principle of the 4G system.

In the above scenarios, in order to ensure the uniqueness of the PGW in the 4G system, the 5G system must decide that the PDU session under a certain SMF can perform interworking with the 4G system while the PDU sessions under other SMFs cannot perform interworking with the 4G system.

Thus there are two problems. The first problem is how the SMF knows whether the PDU session established by the UE on this SMF can perform interworking with the 4G system. When the network is deployed with the N26 interface, the SMF can determine whether PDU session can perform interworking through whether the AMF allocates an EBI, but when the network is not deployed with the N26 interface, the SMF cannot know about that. The SMF/PGW does not know whether it supports interworking, when the SMF/

PGW receives the re-establishment request sent by the MME after moving to the 4G system, the SMF/PGW probably refuses to set up the PDU connection.

The second problem is how the UDM or the HSS handles the PGW identity. For example, in the 5G system, the UE sets up two PDU sessions by using DNN1. the SMF of PDU session 1 is SMF_A+PGW-C_A, and the SMF of PDU session 2 is SMF_B+PGW-C_B. When the UE moves to the 4G system, when the UDM or the HSS delivers subscription data to the MME, only one PGW identity is delivered for APN1 mapped by DNN1. In this case, the UDM or the HSS cannot determine which PGW identity to send to the MME to let the MME know on which PGW the PDN connection can be set up.

To solve the above problems, the embodiments of the present disclosure provide the following specific implementations.

Embodiment One

Figure 2:
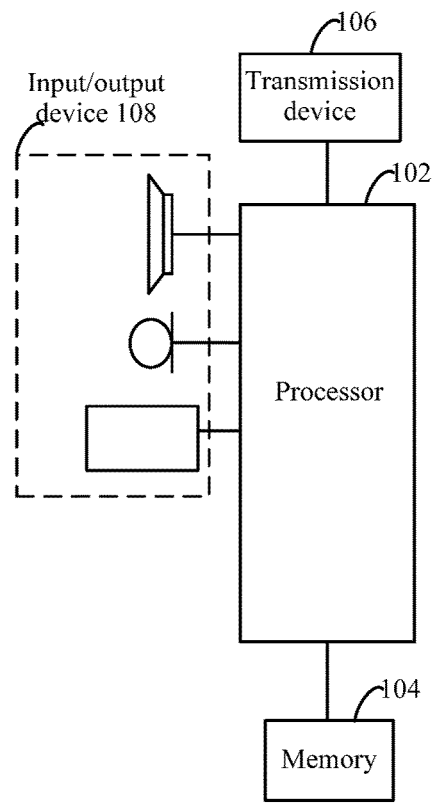
FIG. 2 is a block diagram showing hardware structures of a mobile terminal for an indication information sending method according to an embodiment of the present disclosure.

The method embodiment provided in Embodiment one of the present application can be performed in a mobile terminal, a computer terminal or other similar computing apparatuses. This embodiment is described by using an example in which the method is executed in the mobile terminal. FIG. 2 is a block diagram showing hardware structures of a mobile terminal for an indication information sending method according to an embodiment of the present disclosure. As shown in FIG. 2, a mobile terminal 10 may include one or more (only one is shown in FIG. 2) processors 102 (the processors 102 may include, but are not limited to, a microprocessor such as a microcontroller unit (MCU), a programmable logic device such as a field-programmable gate array (FPGA), and other processing apparatuses), and a memory 104 used for storing data. Optionally, the preceding mobile terminal may further include a transmission device 106 for a communication function and an input/output device 108. It is to be understood by those of ordinary skill in the art that the structure shown in FIG. 2 is merely illustrative and not intended to limit the structure of the preceding mobile terminal. For example, the mobile terminal 10 may further include more or fewer components than the components shown in FIG. 2 or may have a configuration different from the configuration shown in FIG. 2.

The memory 104 may be configured to store a computer program such as a software program and a module of application software, for example, the computer program corresponding to the indication information sending method in the embodiment of the present disclosure. The processor 102 executes the computer program stored in the memory 104 to perform various functional applications and data processing, that is, to implement the method described above. The memory 104 may include a high-speed random access memory, and may further include a nonvolatile memory such as one or more magnetic storage apparatuses, flash memories, or other nonvolatile solid-state memories. In some examples, the memory 104 may further include memories that are remotely disposed with respect to the processors 102. These remote memories may be connected to the mobile terminal 10 via a network. The examples of the preceding network include, but are not limited to, the Internet, an intranet, a local area network, a mobile communication network, and a combination thereof.

The transmission device 106 is configured to receive or send data via a network. Specific examples of the preceding network may include a wireless network provided by a communication provider of the mobile terminal 10. In an example, the transmission device 106 includes a network interface controller (NIC) which may be connected to other network devices via a base station and thus can communicate with the Internet. In an example, the transmission device 106 may be a radio frequency (RF) module which is configured to communicate with the Internet in a wireless way.

Figure 3:
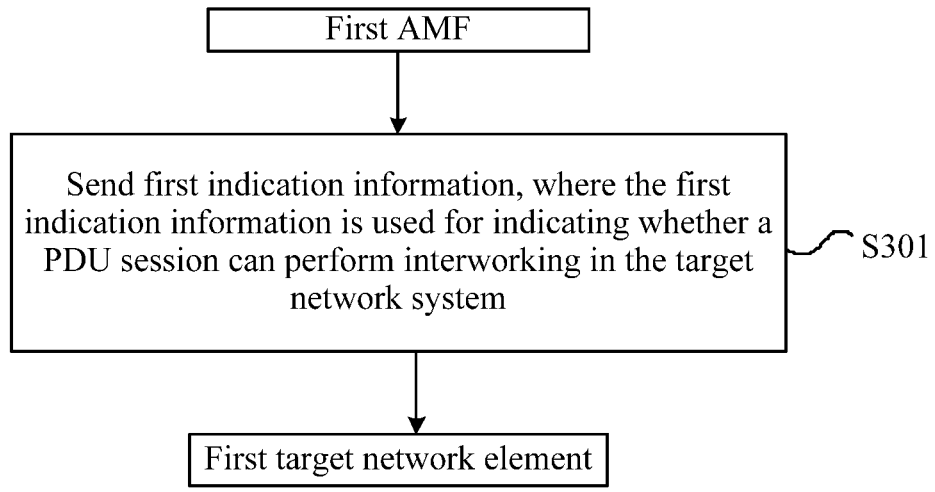
FIG. 3 is a flowchart of an indication information sending method according to an embodiment of the present disclosure.

To solve the first problem described above, the embodiment of the present disclosure provides an indication information sending method. FIG. 3 is a flowchart of an indication information sending method according to an embodiment of the present disclosure. As shown in FIG. 3, the method includes the step described below.

In step S301, a first AMF sends first indication information to a first target network element, where the first indication information is used for indicating whether a PDU session can perform interworking in the target network system.

Through the above method, a first AMF sends first indication information to a first target network element, where the first indication information is used for indicating whether a PDU session can perform interworking to the target network system so that the first target network element can know which PDU session can perform interworking to the target network system and thus can select the corresponding PDU session, thereby solving the problem that the SMF or the PGW does not know whether it can support interworking and thus the interworking across network systems for the UE can not be performed in the related art and implementing the cross-network system interworking for the UE between different network systems.

It is to be noted that the target network system herein may be a 4G system, a 3G system, or a 5G system, and may also be any other network systems that need to implement the cross-network interworking, which is not limited in the embodiment of the present disclosure.

Optionally, the above step S301 may be implemented in the following manner: in response to the first AMF receiving a message in which a UE requests to set up the PDU session, the first AMF sends a PDU session setup request to an SMF, where the PDU session setup request carries the first indication information, and the first indication information is used for indicating whether the PDU session can perform interworking in the target network system.

It is to be noted that the setup request message is sent from the first AMF to the SMF, and in the PDU session setup process, the first indication information carried in the setup request message may be used for indicating whether the currently established PDU session can perform the interworking in the target network system.

Optionally, the above step S301 may be implemented in the following manner: in response to the first AMF determining that a status parameter of the PDU session changes, the first AMF sends a PDU session modification request to an SMF, where the PDU session modification request carries the first indication information, and the first indication information is used for indicating whether the PDU session can perform interworking in the target network system.

It is to be noted that the modification request message is sent from the first AMF to the SMF, and in the PDU session modification process, the first indication information carried in the modification request message may be used for indicating whether the currently modified PDU session can perform the interworking in the target network system. That the status parameter changes may be that the state of the current PDU session changes from a state of being able to perform interworking in the target network system to a state of not being able to perform interworking in the target network system, or that the state of the current PDU session changes from a state of not being able to perform interworking in the target network system to a state of being able to perform interworking in the target network system.

Optionally, the above step S301 may further be implemented in the following manner: in response to a inter-AMF mobility event in which the UE is transferred from the first AMF to a second AMF occurring, the first AMF sends the first indication information to the second AMF, where the first indication information is used for indicating whether the PDU session of the UE under the first AMF can perform interworking in the target network system.

It is to be noted that the inter-AMF mobility event herein includes at least one of a connected state handover process or an idle state mobility process. In this case, the message carried in the first indication information may be whether part or all of PDU sessions belonging to the same UE under the first AMF can perform interworking in the target network system.

Optionally, the step in which the first AMF sends the first indication information to the second AMF may be implemented in the following manner: the first AMF sends a UE context message to the second AMF, where the UE context message carries the first indication information.

Optionally, the above step S301 may further be implemented in the following manner: the first AMF sends the first indication information to the SMF, where the first indication information is used for indicating whether the PDU session under the SMF can perform interworking in the target network system; and in response to an inter-AMF mobility event in which the UE is transferred from the first AMF to a second AMF occurring, the SMF sends a message the second AMF, where the message is used for indicating whether the PDU session under the SMF can perform interworking in the target network system.

It is to be noted that the process herein may be understood that when a mobility event occurs, the first AMF does not directly send the first indication information to the second AMF but sends the first indication information to the SMF, and the SMF may indicate whether the PDU session under the current SMF can perform interworking in the target network system by sending a message to the second AMF.

Figure 4:
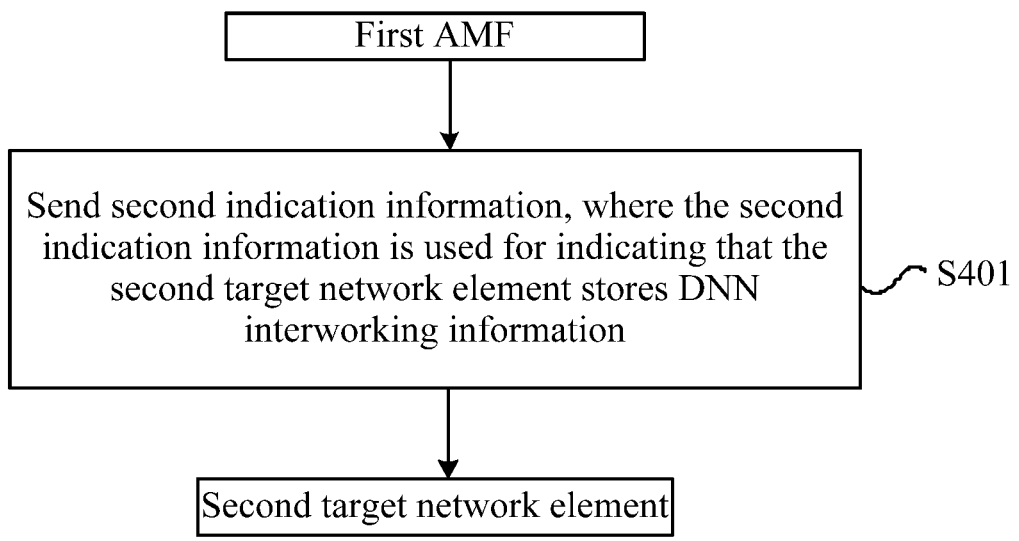
FIG. 4 is a flowchart of an indication information sending method according to an embodiment of the present disclosure.

To solve the second problem described above, the embodiment of the present disclosure provides an indication information sending method. FIG. 4 is a flowchart of an indication information sending method according to an embodiment of the present disclosure. As shown in FIG. 4, the method includes the step described below.

In step S401, a first AMF sends second indication information to a second target network element.

Through the above method, a first AMF sends second indication information to a second target network element, where the second indication information is used for indicating that the second target network element stores DNN interworking information, thereby solving the problem that the UDM or the HSS cannot determine to send which one to the MME to let the MME know on which PGW the PDU connection can be re-established and thus the interworking across network systems for the UE can not be performed in the related art and implementing the cross-network system interworking for the UE between different network systems.

Optionally, the step S401 may be implemented in the following manner: the first AMF sends the second indication information to a UDM or an HSS, where the second indication information is used for indicating that the UDM or the HSS stores the DNN interworking information, and the DNN interworking information includes DNN information and at least one of: an SMF address or a PGW address.

Optionally, for each DNN, the UDM or the HSS stores one piece of DNN interworking information corresponding to the DNN. The above can be understood that each DNN has an independent message to store corresponding interworking information, for example, DNN1 corresponds to multiple SMFs/PGWs, but only SMF1 and/or PGW1 can support interworking across network systems, and in this case, the stored DNN interworking information may include (DNN1, SMF1) or (DNN1, PGW 1) or (DNN1, SMF1, PGW1).

Optionally, the above step S401 may be implemented in the following manner: in response to an inter-AMF mobility event in which the UE is transferred from the first AMF to a second AMF occurring, the first AMF sends the second indication information to the second AMF, where the second indication information is used for indicating to store the DNN interworking information, and the DNN interworking information includes DNN information and at least one of: an SMF address or a PGW address.

Likewise, the inter-AMF mobility event herein includes at least one of a connected state handover process or an idle state mobility process. In this case, the DNN interworking information carried in the second indication information may be part or all of DNN interworking information belonging to the same UE under the first AMF.

Optionally, the step in which the first AMF sends the second indication information to the second AMF may be implemented in the following manner: the first AMF sends a UE context message to the second AMF, where the UE context message carries the second indication information.

Embodiment Two

In the embodiment, an indication information sending apparatus is further provided. The apparatus is configured to implement the preceding embodiment and preferred implementations. What has been described will not be repeated. As used below, the term "module" may be software, hardware, or a combination thereof capable of implementing predetermined functions. The apparatus described below in this embodiment is implemented by software, but implementation by hardware or by a combination of software and hardware is also possible and conceived.

Figure 5:
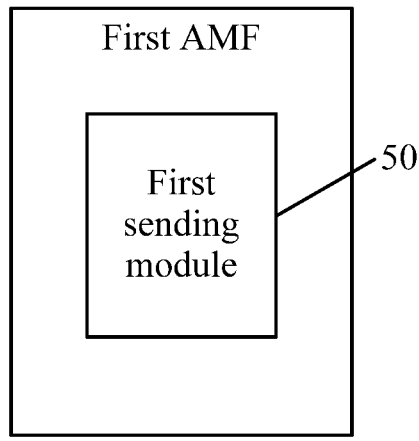
FIG. 5 is a structural block diagram of an indication information sending apparatus according to an embodiment of the present disclosure.

According to another aspect of the embodiments of the present disclosure, an indication information sending apparatus is further provided. The apparatus is applied to a first AMF and is configured to implement the above method. FIG. 5 is a structural block diagram of an indication information sending apparatus according to an embodiment of the present disclosure. As shown in FIG. 5, the apparatus includes a first sending module 50, which is configured to send first indication information to a target network element, where the first indication information is used for indicating whether a PDU session can perform interworking in the target network system.

Through the above apparatus, the problem that the SMF or the PGW does not know whether it can support interworking and thus the interworking across network systems for the UE can not be performed in the related art can be solved, and the cross-network system interworking for the UE between different network systems can be implemented.

Optionally, the first sending module 50 includes a first sending unit, which is configured to, in response to the first AMF receiving a message in which a UE requests to set up the PDU session, send PDU session setup request to an SMF, where the PDU session setup request carries the first indication information, and the first indication information is used for indicating whether the PDU session can perform interworking in the target network system.

Optionally, the first sending module 50 further includes a second sending unit, which is configured to, in response to the first AMF determining that a status parameter of the PDU session changes, send a PDU session modification request to an SMF, where the PDU session modification request carries the first indication information, and the first indication information is used for indicating whether the PDU session can perform the interworking in the target network system.

Optionally, the first sending module 50 further includes a third sending unit, which is configured to, in response to an inter-AMF mobility event in which the UE transfers from the first AMF to a second AMF occurring, send the first indication information to the second AMF, where the first indication information is used for indicating whether the PDU session of the UE under the first AMF can perform the interworking in the target network system.

Figure 6:
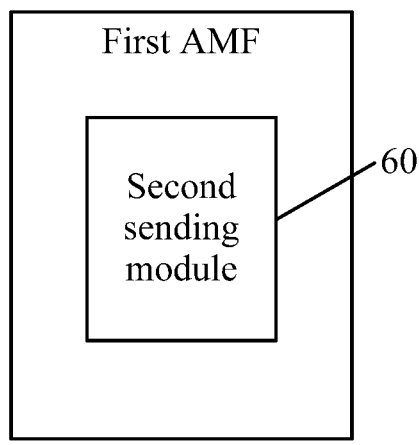
FIG. 6 is a structural block diagram of an indication information sending apparatus according to an embodiment of the present disclosure.

According to another aspect of the embodiments of the present disclosure, an indication information sending apparatus is further provided. The apparatus is applied to a first AMF and is configured to implement the above method. FIG. 6 is a structural block diagram of an indication information sending apparatus according to an embodiment of the present disclosure. As shown in FIG. 6, the apparatus includes a second sending module 60, which is configured to send second indication information to a second target network element, where the second indication information is used for indicating that the second target network element stores DNN interworking information.

Through the above apparatus, a first AMF sends second indication information to a second target network element, where the second indication information is used for indicating that the second target network element stores DNN interworking information, thereby solving the problem that the UDM or the HSS cannot determine to send which one to the MME to let the MME know on which PGW the PDN connection can be re-established and thus the interworking across network systems for the UE can not be performed in the related art and implementing the cross-network system interworking for the UE between different network systems.

Optionally, the second sending module 60 includes a fourth sending unit, which is configured to send the second indication information to a UDM or an HSS, where the second indication information is used for indicating that the UDM or the HSS stores the DNN interworking information, and the DNN interworking information includes DNN information and at least one of: an SMF address or a PGW address.

Optionally, for each DNN, the UDM or the HSS stores one piece of DNN interworking information corresponding to the DNN.

Optionally, the second sending module 60 further includes a fifth sending unit, which is configured to, in response to an inter-AMF mobility event in which the UE is transferred the first AMF to a second AMF occurring, send the second indication information to the second AMF, where the second indication information is used for indicating to store the DNN interworking information, and the DNN interworking information includes DNN information and at least one of: an SMF address or a PGW address.

Figure 7:
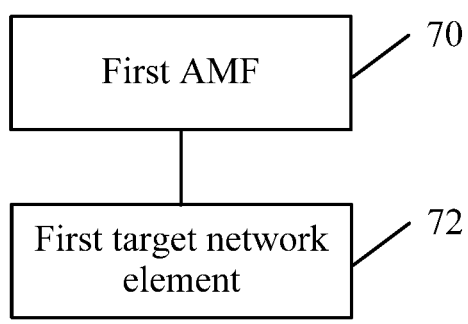
FIG. 7 is a structural block diagram of an indication information sending system according to an embodiment of the present disclosure.

According to another aspect of the embodiments of the present disclosure, an indication information sending system is further provided. The system is used for bearing the above apparatus and implementing the above method. FIG. 7 is a structural block diagram of an indication information sending system according to an embodiment of the present disclosure. As shown in FIG. 7, the system includes: a first AMF 70, which is configured to send first indication information to a target network element; and a first target network element 72, which is configured to determine whether a PDU session can perform interworking in a target network system according to the first indication information.

Through the above system, the problem that the SMF or the PGW does not know whether it can support interworking and thus the interworking across network systems for the UE can not be performed in the related art can be solved, and the cross-network system interworking for the UE between different network systems can be implemented.

Optionally, the first target network element 72 includes an SMF, and in response to the first AMF receiving a message in which a UE requests to set up the PDU session, the first AMF is further configured to send a PDU session setup request to the SMF, where the PDU session setup request carries the first indication information, and the SMF is configured to determine whether the PDU session can perform interworking in a target network system according to the first indication information.

Optionally, in response to the first AMF determining that a status parameter of the PDU session changes, the first AMF is further configured to send PDU session modification request to an SMF, where the PDU session modification request carries the first indication information, and the SMF is configured to determine whether the PDU session whose status parameter has changed can perform interworking in the target network system.

Optionally, the first target network element 72 further includes a second AMF, and in response to a inter-AMF mobility event in which the UE transfers from the first AMF to a second AMF occurring, the first AMF is further configured to send the second indication information to the second AMF, and the second AMF is configured to determine whether the PDU session under the first AMF can perform interworking in the target network system according to the first indication information.

Figure 8:
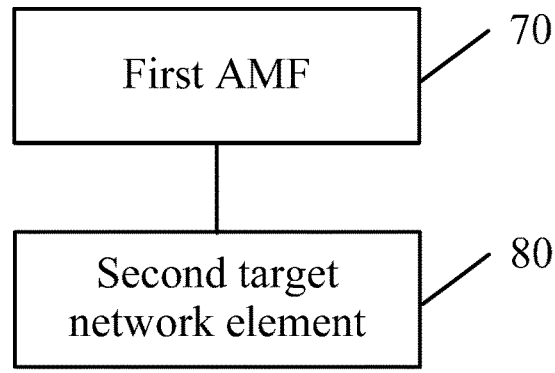
FIG. 8 is a structural block diagram of an indication information sending system according to an embodiment of the present disclosure.

According to another aspect of the embodiments of the present disclosure, an indication information sending system is further provided. The system is used for bearing the above apparatus and implementing the above method. FIG. 8 is a structural block diagram of an indication information sending system according to an embodiment of the present disclosure. As shown in FIG. 8, the system includes: a first AMF 70, which is configured to send second indication information to a second target network element, where the second indication information carries DNN interworking information; and a second target network element 80, which is configured to store the DNN interworking information according to the second indication information.

Through the above system, a first AMF sends second indication information to a second target network element, where the second indication information is used for indicating that the second target network element stores DNN interworking information, thereby solving the problem that the UDM or the HSS cannot determine to send which one to the MME to let the MME know on which PGW the PDN connection can be re-established and thus the interworking across network systems for the UE can not be performed in the related art and implementing the cross-network system interworking for the UE between different network systems.

Optionally, the second target network element includes a UDM or an HSS, and the UDM or the HSS is configured to store the DNN interworking information according to the second indication information, where the DNN interworking information includes DNN information and at least one of: an SMF address or a PGW address.

Optionally, the second target network element includes a second AMF, and in response to a inter-AMF mobility event in which the UE transfers from the first AMF to a second AMF occurring, the first AMF is further configured to send the second indication information to the second AMF, where the second indication information carries the DNN interworking information, and the second AMF is configured to store the DNN interworking information according to the second indication information, where the DNN interworking information includes DNN information and at least one of: an SMF address or a PGW address.

Embodiment Three

In order to better understand the solutions in the above embodiments, the embodiments of the present disclosure provide the following examples to illustrate specific application scenarios by using an example in which the UE moves from the 5G system to the 4G system.

Example One

The example proposes that the AMF informs the SMF in the process of PDU session setup and modification whether the PDU session or the PDU session of the UE on this SMF can perform interworking with the 4G system.

Figure 9:
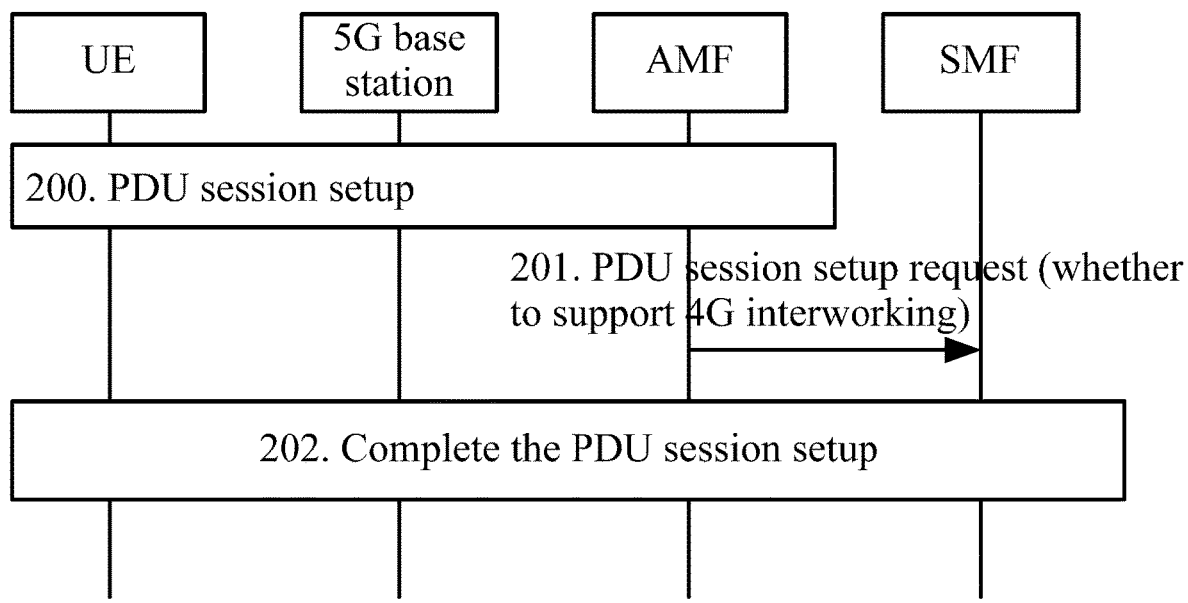
FIG. 9 is a flowchart of a PDU session setup method according to an example one of the present disclosure.

FIG. 9 is a flowchart of a PDU session setup method according to an example one of the present disclosure. As shown in FIG. 9, the setup process includes the steps described below.

In step 200, the UE requests to set up a PDU session.

In step 201, the AMF sends a PDU session setup request to the SMF, where the PDU session setup request carries indication information indicating whether the PDU session can perform interworking with the 4G system.

In step 202, the PDU session setup process is completed.

Figure 10:
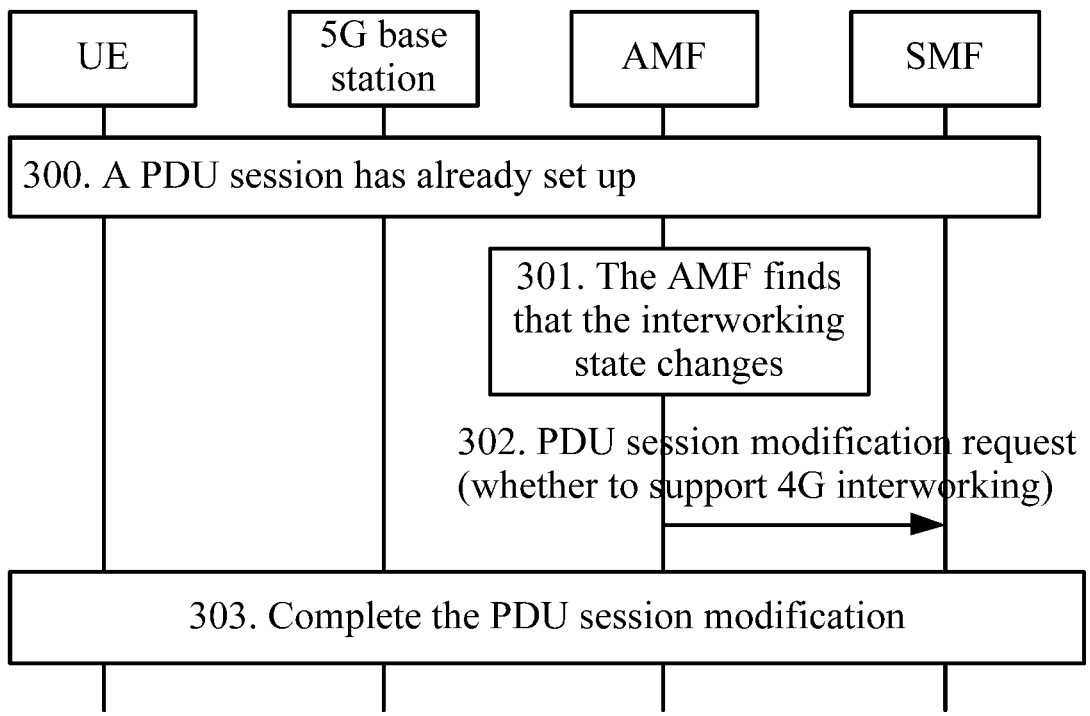
FIG. 10 is a flowchart of a PDU session modification method according to the example one of the present disclosure.

FIG. 10 is a flowchart of a PDU session modification method according to the example one of the present disclosure. As shown in FIG. 10, the modification process includes the steps described below.

In step 300, the UE has set up the PDU session, where the status of the PDU session may be that the PDU session can perform interworking with the 4G system or that the PDU session cannot perform intreworking.

In step 301, the AMF determines that the status of interworking with 4G of the PDU session changes.

In step 302, the AMF sends a PDU session modification request to the SMF, where the PDU session modification request carries indication information indicating whether the PDU session can perform interworking with the 4G system. For example, the status of the PDU session, which was that the PDU session cannot perform interworking, now becomes that the PDU session can perform interworking; or the status of the PDU session, which was that the PDU session can perform interworking, now becomes that the PDU session cannot perform interworking.

In step 303, the PDU session modification process is completed.

The above process may be combined in various manners.

In a manner one, when the PDU session is set up, the SMF and the AMF always support interworking by default, and when the interworking status changes, the SMF needs to be notified (that is, only the steps in FIG. 10 need executing).

In a manner two, when the PDU session is set up, the interworking is not supported by default, and when the interworking status changes, the SMF needs to be notified (that is, only the steps in FIG. 10 need executing).

In a manner three, when the PDU session is set up, it is always explicitly notified whether the interworking is supported, and when the interworking status changes, the SMF needs to be notified (the steps in FIGS. 9 and 10 need executing).

Example Two

In response to a inter-AMF mobility process occurs, such as the process of connected state handover or idle state mobility, the source AMF (which may be equivalent to the first AMF in the above embodiments) needs to send an indication indicating whether the PDU session supports interworking with 4G to the target AMF (which may be equivalent to the second AMF in the above embodiments).

Figure 11:
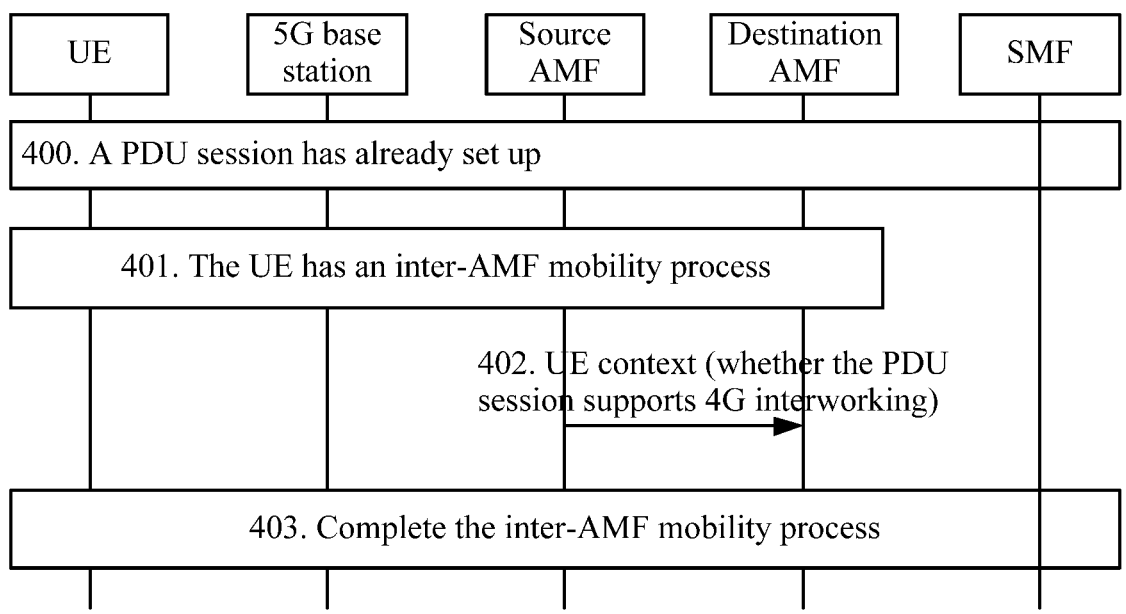
FIG. 11 is a flowchart of a inter-AMF mobility process according to an example two of the present disclosure.

FIG. 11 is a flowchart of a inter-AMF mobility process according to an example two of the present disclosure. As shown in FIG. 11, the mobility process includes the steps described below.

In step 400, the UE has set up the PDU session, where the status of the PDU session may be that the PDU session can perform interworking with the 4G system or that the PDU session cannot perform interworking.

In step 401, the UE has a inter-AMF mobility process such as the process of the connected state handover or idle state mobility.

In step 402, the UE context sent by the source AMF to the target AMF carries an indication indicating whether the PDU session supports the interworking with 4G or carries an indication indicating whether PDU sessions under a certain SMF support the interworking with 4G.

In step 403, the inter-AMF mobility process is completed.

Example Three

In response to a inter-AMF mobility process occurs, such as the process of connected state handover or idle state mobility, the SMF sends an indication indicating whether the PDU session supports interworking with 4G to the target AMF.

Figure 12:
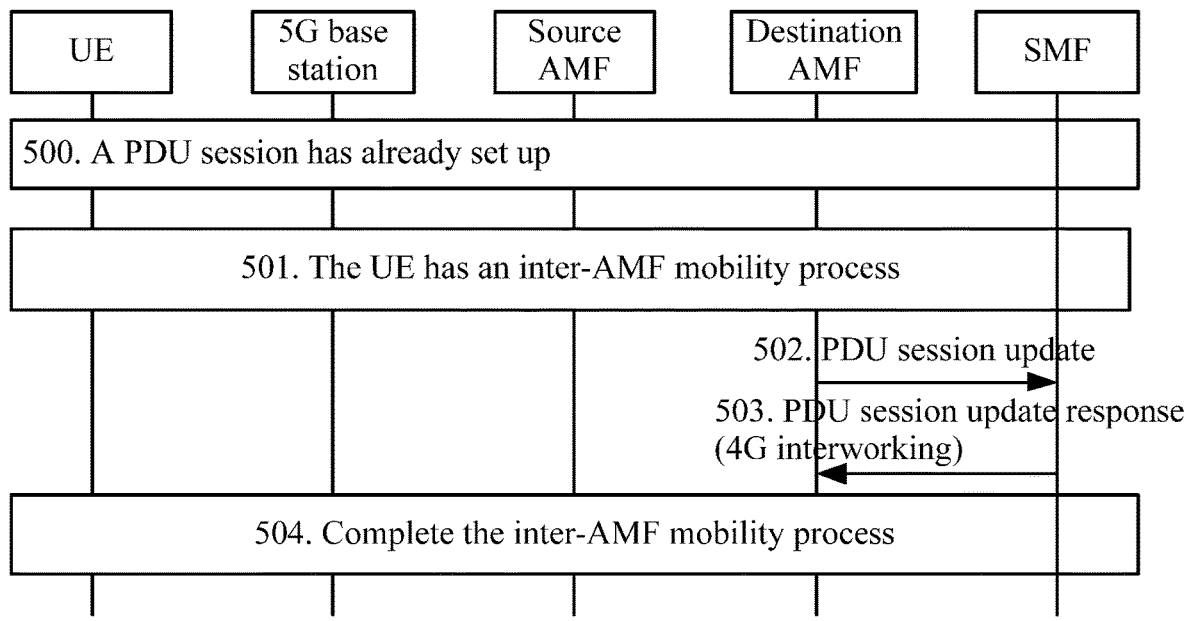
FIG. 12 is a flowchart of a inter-AMF mobility process according to an example three of the present disclosure.

FIG. 12 is a flowchart of a inter-AMF mobility process according to an example three of the present disclosure. As shown in FIG. 12, the mobility process includes the steps described below.

In step 500, the UE has set up the PDU session, where the status of the PDU session may be that the PDU session can perform interworking with the 4G system or that the PDU session cannot perform interworking.

In step 501, the UE has a inter-AMF mobility process such as the process of the connected state handover or idle state mobility.

In step 502, the target AMF sends PDU session update to the SMF.

In step 503, the SMF sends a PDU session update response to the target AMF, where the PDU session update response carries an indication indicating whether the PDU session supports interworking with 4G.

In step 504, the inter-AMF mobility process is completed.

Example Four

For each DNN in which the PDU session is set up with the UE, the AMF stores interworking information in the UDM or the HSS, modifies the interworking information, or deletes the interworking information from the UDM or the HSS, where the information includes DNN and PGW identification information and/or SMF identification information and may also include corresponding access types. The information is not stored in each PDU session context on each UDM or HSS, and for the UE, for each DNN, there is a piece of independent 4G-5G interworking information. When the UE moves to 4G, the UDM or the HSS sends APN and PGW identification information to the MME.

Figure 13:
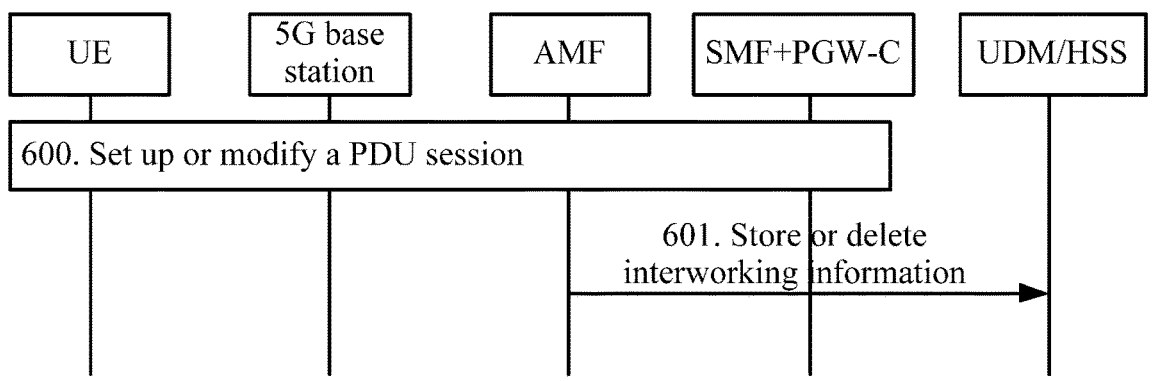
FIG. 13 is a flowchart illustrating an interworking information sending process according to an example four of the present disclosure.

FIG. 13 is a flowchart illustrating an interworking information sending process according to an example four of the present disclosure. As shown in FIG. 13, the method includes the steps described below.

In step 600, a PDU session is set up or modified for the UE.

In step 601, the AMF stores 4G-5G interworking information in the UDM or the HSS, where the information includes a DNN and corresponding PGW-C identification information and/or SMF identification information, and/or corresponding access types (for example, 3GPP access or non-3GPP access). When there is no PDU session supporting the interworking, the AMF may delete the above-mentioned 4G-5G interworking information stored in the UDM or the HSS. The information is not stored in each PDU session context of the UE in the UDM or the HSS, and for the UE, for each DNN, there is a piece of 4G-5G interworking information. When the UE has PUD sessions on multiple DNNs, a piece of 4G-5G interworking information is stored each DNN.

Example Five

In response to a inter-AMF mobility process occurs, such as the process of connected state handover or idle state mobility, the source AMF needs to send 4G-5G interworking information to the target AMF. The information includes a DNN and corresponding PGW-C identification information and/or SMF identification information and/or corresponding access types (for example, 3GPP access or non-3GPP access).

Figure 14:
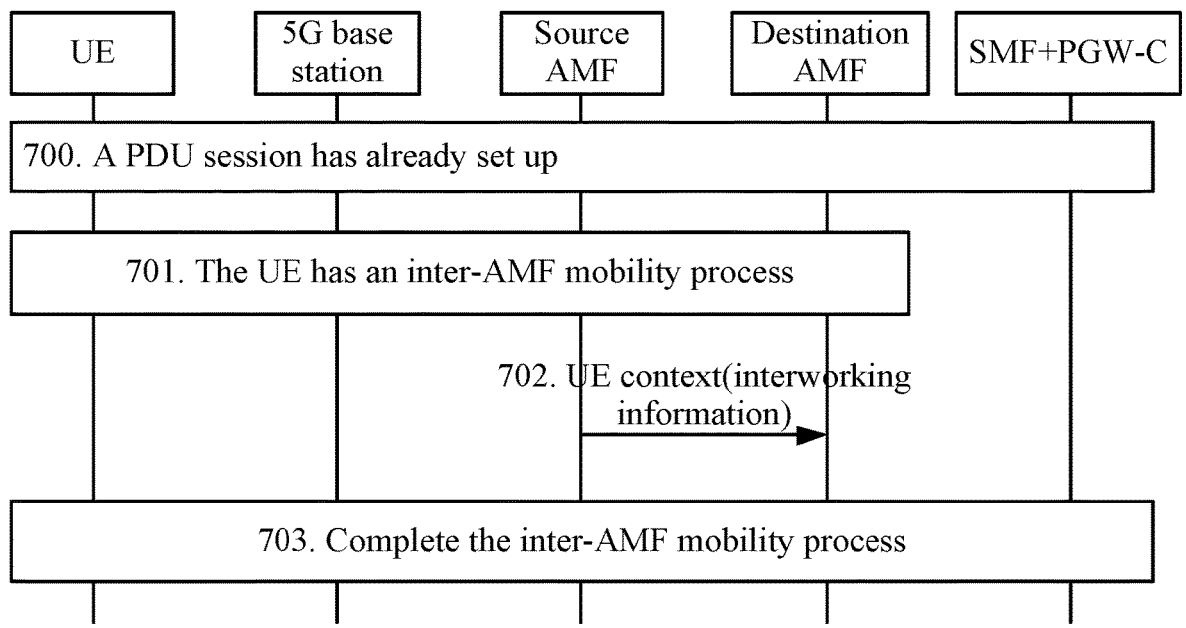
FIG. 14 is a flowchart illustrating an interworking information sending process according to an example five of the present disclosure.

FIG. 14 is a flowchart illustrating an interworking information sending process according to an example five of the present disclosure. As shown in FIG. 14, the method includes the steps described below.

In step 700, the UE has set up the PDU session, where the status of the PDU session may be that the PDU session can perform interworking with the 4G system or that the PDU session cannot perform interworking with 4G.

In step 701, the UE has a inter-AMF mobility process such as the process of the connected state handover or idle state mobility.

In step 702, the UE context sent by the source AMF to the target AMF carries 4G-5G interworking information. The information includes a DNN and corresponding PGW-C identification information and/or SMF identification information and/or corresponding access types (for example, 3GPP access or non-3GPP access).

In step 703, the inter-AMF mobility process is completed.

Example Six

The SMF stores interworking information in the UDM or the HSS, where the information includes DNN and PGW identification information and/or SMF identification information and may also include corresponding access types. The information is not stored in the PDU session context in the UDM or the HSS, and for the UE, for each DNN, there is a piece of 4G-5G interworking information. When the UE moves to 4G, the UDM or the HSS sends APN and PGW identification information to the MME.

Figure 15:
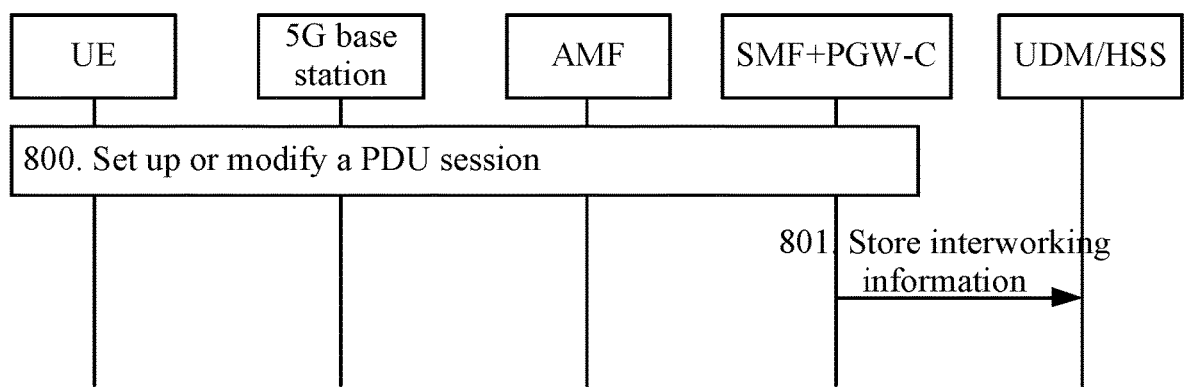
FIG. 15 is a flowchart illustrating an interworking information sending process according to an example six of the present disclosure.

FIG. 15 is a flowchart illustrating an interworking information sending process according to an example six of the present disclosure. As shown in FIG. 15, the method includes the steps described below.

In step 800, a PDU session is set up or modified for the UE.

In step 801, the SMF stores 4G-5G interworking information in the UDM or the HSS, where the information includes a DNN and corresponding PGW-C identification information and/or SMF identification information, and/or corresponding access types (for example, 3GPP access or non-3GPP access). The information is not stored in the PDU session context in the UDM or the HSS, and for the UE, for the DNN of the PDU session, there is a piece of independent 4G-5G interworking information. When the UE has PUD sessions on multiple DNNs, a piece of 4G-5G interworking information is stored each DNN.

Embodiment Four

The embodiment of the present application further provides a storage medium. The storage medium stores a computer program which is configured to, when executed, perform the steps in any one of the preceding method embodiments Optionally, in the embodiment, the storage medium may be configured to store a computer program for executing the following step: S1, a first AMF sends first indication information to a first target network element, where the first indication information is used for indicating whether a PDU session can perform interworking in a target network system.

Optionally, the storage medium is further configured to store a computer program for executing the following step: in response to the first AMF receiving a message in which a UE requests to set up the PDU session, the first AMF sends PDU session setup request to an SMF, where the PDU session setup request carries the first indication information, and the first indication information is used for indicating whether the PDU session can perform interworking in the target network system.

Optionally, the storage medium is further configured to store a computer program for executing the following step: in response to the first AMF determining that a status parameter of the PDU session changes, the first AMF sends a PDU session modification request to an SMF, where the PDU session modification request carries the first indication information, and the first indication information is used for indicating whether the PDU session can perform interworking in the target network system.

Optionally, the storage medium is further configured to store a computer program for executing the following step: in response to a inter-AMF mobility event in which the UE transfers from the first AMF to a second AMF occurring, the first AMF sends the first indication information to the second AMF, where the first indication information is used for indicating whether the PDU session of the UE under the first AMF can perform interworking in the target network system.

Optionally, in the embodiment, the storage medium may be configured to store a computer program for executing the following step: S1, a first AMF sends second indication information to a second target network element, where the second indication information is used for in which the second target network element store DNN interworking information.

Optionally, the storage medium is further configured to store a computer program for executing the following step: the first AMF sends the second indication information to a UDM or an HSS, where the second indication information is used for indicating that the UDM or the HSS stores the DNN interworking information, and the DNN interworking information includes DNN information and at least one of: an SMF address or a PGW address.

Optionally, the storage medium is further configured to store a computer program for executing the following step: in response to a inter-AMF mobility event in which the UE transfers from the first AMF to a second AMF occurring, the first AMF sends the second indication information to the second AMF, where the second indication information is used for indicating that the UDM or the HSS stores the DNN interworking information, and the DNN interworking information includes DNN information and at least one of: an SMF address or a PGW address.

Optionally, in the embodiment, the storage medium may include, but is not limited to, a USB flash drive, a read-only memory (ROM), a random access memory (RAM), a mobile hard disk, a magnetic disk, an optical disk or another medium capable of storing a computer program.

The embodiments of the present application further provide an electronic device. The electronic device includes a memory and a processor. The memory stores a computer program, and the processor is configured to execute the computer program to perform the steps in any one of the preceding method embodiments.

Optionally, the electronic apparatus may further include a transmission device and an input/output device. Both the transmission device and the input/output device are connected to the processor.

Optionally, in the embodiment, the processor may be configured to perform the following step through a computer program.

In S1, a first AMF sends first indication information to a target network element, where the first indication information is used for indicating whether a PDU session can perform interworking in a target network system.

Optionally, the processor is further configured to perform the following step through a computer program.

In response to the first AMF receiving a message in which a UE requests to set up the PDU session, the first AMF sends a PDU session setup request to an SMF, where the PDU session setup request carries the first indication information, and the first indication information is used for indicating whether the PDU session can perform interworking in the target network system.

Optionally, the processor is further configured to perform the following step through a computer program.

In response to the first AMF determining that a status parameter of the PDU session changes, the first AMF sends PDU session modification request to an SMF, where the PDU session modification request carries the first indication information, and the first indication information is used for indicating whether the PDU session can perform interworking in the target network system.

Optionally, the processor is further configured to perform the following step through a computer program: in response to an inter-AMF mobility event in which the UE is transferred from the first AMF to a second AMF occurring, the first AMF sends the first indication information to the second AMF, where the first indication information is used for indicating whether the PDU session of the UE under the first AMF can perform interworking in the target network system.

Optionally, in the embodiment, the processor is further configured to perform the following step through a computer program: S1, a first AMF sends second indication information to a second target network element, where the second indication information is used for indicating that the second target network element stores DNN interworking information.

Optionally, the processor is further configured to perform the following step through a computer program: the first AMF sends the second indication information to a UDM or an HSS, where the second indication information is used for indicating that the UDM or the HSS stores the DNN interworking information, and the DNN interworking information includes DNN information and at least one of: an SMF address or a PGW address.

Optionally, the processor is further configured to perform the following step through a computer program: in response to an inter-AMF mobility event in which the UE is transferred from the first AMF to a second AMF occurring, the first AMF sends the second indication information to the second AMF, where the second indication information is used for indicating that the UDM or the HSS stores the DNN interworking information, and the DNN interworking information includes DNN information and at least one of: an SMF address or a PGW address.

Optionally, for specific examples in this embodiment, reference may be made to the examples described in the preceding embodiments and optional embodiments, and these examples will not be repeated in this embodiment.

Apparently, it is to be understood by those having ordinary skill in the art that each of the modules or steps of the present application may be implemented by a general-purpose computing apparatus and may be concentrated on a single computing apparatus or distributed on a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in sequences different from the sequence described herein. Alternatively, these modules or steps may be implemented by being made into integrated circuit modules separately or multiple ones of these modules or steps may be implemented by being made into a single integrated circuit module. In this manner, the present application is not limited to any specific combination of hardware and software.

The above are only embodiments of the present application and are not intended to limit the present application, and for those skilled in the art, the present application may have various modifications and variations. Any modifications, equivalent substitutions, improvements and the like made within the principle of the present application should fall within the scope of the present application.

What is claimed is:

1. An indication information sending method, comprising:
sending, by a first access and mobility management function (AMF) in response to the first AMF receiving a request message in which a user equipment (UE) requests to set up a packet data unit (PDU) session, a PDU session setup request to a session management function (SMF), the PDU session setup request carrying first indication information; and sending, by the first AMF in response to the first AMF determining that a status parameter of the PDU session changes, a PDU session modification request to the SMF, the PDU session modification request carrying the first indication information, wherein the first indication information is used for indicating whether the PDU session is capable of interworking with a target network system, based on which the UE interworks with the target network system during the PDU session.

2. The method of claim 1, further comprising:
sending, by the first AMF in response to occurrence of an inter-AMF mobility event in which the UE is transferred from the first AMF to a second AMF, the first indication information to the second AMF, wherein the first indication information is used for indicating to the second AMF whether the PDU session of the UE under the first AMF is capable of interworking with the target network system.

3. The method of claim 2, wherein sending, by the first AMF, the first indication information to the second AMF comprises:
sending, by the first AMF, a UE context message to the second AMF, wherein the UE context message carries the first indication information.

4. The method of claim 2, wherein the inter-AMF mobility event comprises at least one of:
a connected state handover process or an idle state mobility process.

5. The method of claim 1, further comprising:
sending, by the SMF in response to occurrence of an inter-AMF mobility event in which the UE is transferred from the first AMF to a second AMF, a message to the second AMF, wherein the message is used for indicating whether the PDU session under the SMF is capable of interworking with the target network system.

6. The method of claim 1, wherein the target network system comprises a fourth generation (4G) network system.

7. A non-transitory storage medium storing a computer program, which is configured to, when executed, perform the method of claim 1.

8. An electronic apparatus, comprising a memory and a processor, wherein the memory is configured to store a computer program, and the processor is configured to execute the computer program to perform the steps comprising:
sending, by a first access and mobility management function (AMF) in response to the first AMF receiving a request message in which a user equipment (UE) requests to set up a packet data unit (PDU) session, a PDU session setup request to a session management function (SMF), the PDU session setup request carrying a first indication information; and
sending, by the first AMF in response to the first AMF determining that a status parameter of the PDU session changes, a PDU session modification request to the SMF, the PDU session modification request carrying the first indication information, wherein the first indication information is used for indicating whether the PDU session is capable of interworking with a target network system, based on which the UE interworks with the target network system during the PDU session.

9. The electronic apparatus of claim 8, wherein the steps the processor is configured to perform further comprises:
sending, by the first AMF in response to occurrence of an inter-AMF mobility event in which the UE is transferred from the first AMF to a second AMF, the first indication information to the second AMF, wherein the first indication information is used for indicating to the second AMF whether the PDU session of the UE under the first AMF is capable of interworking with the target network system.

10. The electronic apparatus of claim 8, wherein the steps the processor is configured to perform further comprises:
sending, by the SMF in response to occurrence of an inter-AMF mobility event in which the UE is transferred from the first AMF to a second AMF, a message to the second AMF, wherein the message is used for indicating whether the PDU session under the SMF is capable of interworking with the target network system.

11. The electronic apparatus of claim 8, wherein the target network system comprises a fourth generation (4G) network system.

* * * * *